(No Model.) 3 Sheets—Sheet 1.

C. A. BRAINERD.
ELECTRICAL DEVICE FOR PROTECTING WIRE FENCES.

No. 279,322. Patented June 12, 1883.

WITNESSES:
E. R. L. Beadle
Wm. T. Emerson.

INVENTOR:
C. A. BRAINERD,
BY H. W. Beadle & Co.
ATTYS.

(No Model.)　　　　　　　　　　　　　　　　　3 Sheets—Sheet 2.
C. A. BRAINERD.
ELECTRICAL DEVICE FOR PROTECTING WIRE FENCES.
No. 279,322.　　　　　　　　Patented June 12, 1883.
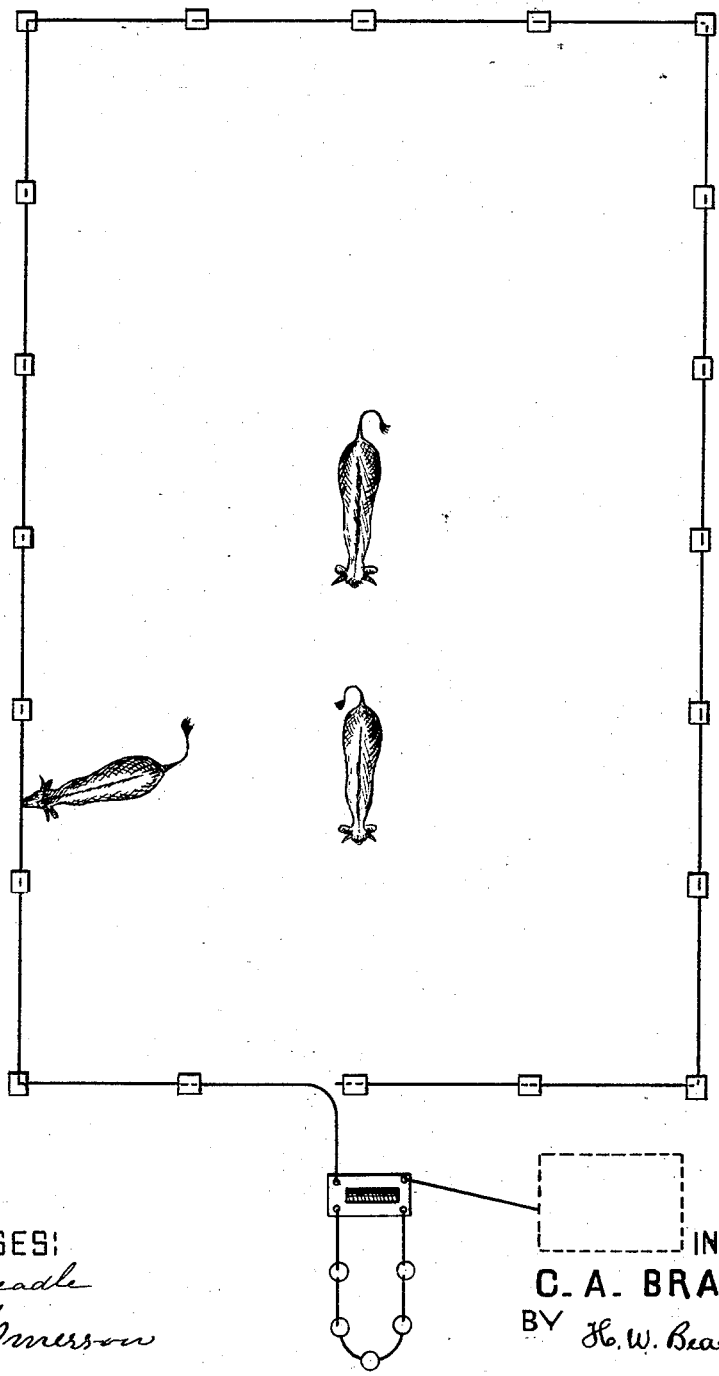
WITNESSES:
E. R. L. Beadle
Wm. T. Emerson
INVENTOR:
C. A. BRAINERD,
BY H. W. Beadle & Co.
ATTYS.

(No Model.) 3 Sheets—Sheet 3.
C. A. BRAINERD.
ELECTRICAL DEVICE FOR PROTECTING WIRE FENCES.
No. 279,322. Patented June 12, 1883.
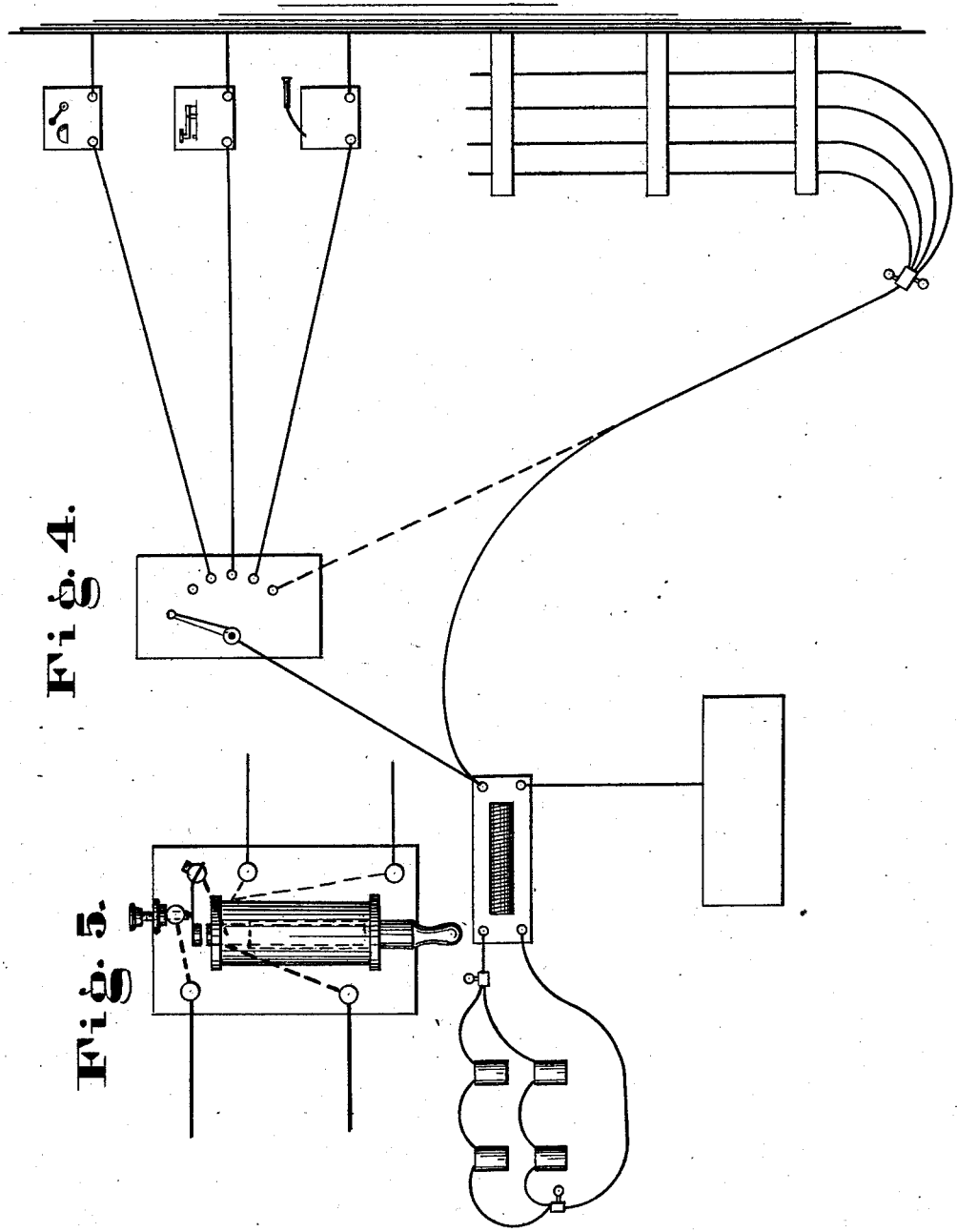
WITNESSES:
T. S. West
Wm. T. Emerson
INVENTOR:
C. A. BRAINERD,
BY H. W. Beadle + Co.
ATTYS.

UNITED STATES PATENT OFFICE.

CHARLES A. BRAINERD, OF CHICAGO, ILLINOIS.

ELECTRICAL DEVICE FOR PROTECTING WIRE FENCES.

SPECIFICATION forming part of Letters Patent No. 279,322, dated June 12, 1883.

Application filed March 9, 1883. (No model.)

*To all whom it may concern:*

Be it known that I, CHARLES A. BRAINERD, of Chicago, county of Cook, and State of Illinois, have invented new and useful Improvements in Electrical Devices for Protecting Wire Fences; and I do hereby declare that the following is a full and exact description of the same, reference being had to the accompanying drawings, and to the letters of reference marked thereon.

This invention has for its object the repelling of animals or intruders from a fence made wholly or in part of wire or other metal conductor; and it consists, mainly, in charging such wire or other metal conductor with electricity in such manner that contact of a conducting-body between said wire or conductor and the earth is required to complete the circuit, as hereinafter more fully set forth.

It consists, further, in the special appliances employed to carry the foregoing method practically into effect.

Figure 1:
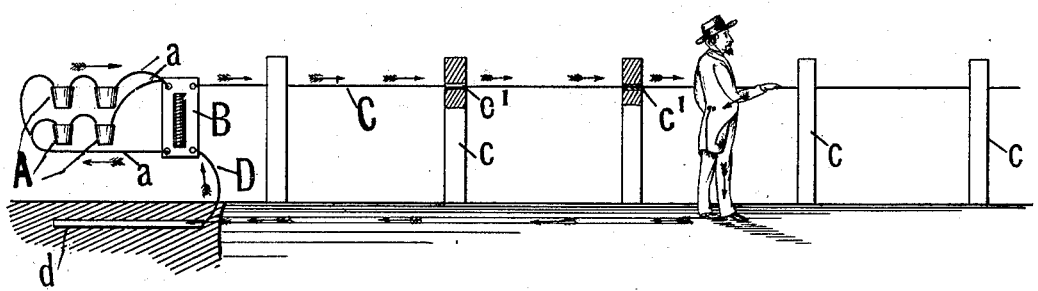
Figure 2:
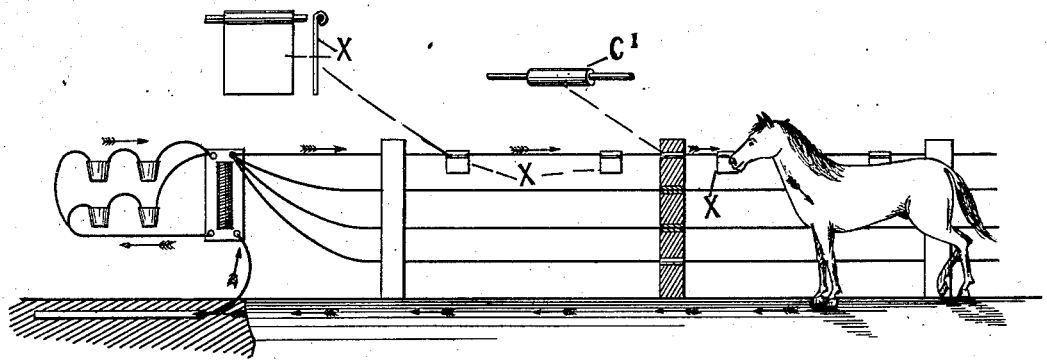

In the drawings, Figure 1 represents the appliances for generating the electrical current in connection with a fence having a single line of wire; Fig. 2, a similar view, with a fence having several lines of wire; Fig. 3, a general view, representing an inclosed field; Fig. 4, a view illustrating the use of a switch in connection with the principal elements of my invention, and Fig. 5 an enlarged view of the induction-coil and automatic circuit-breaker.

To enable others skilled in the art to understand my invention and to carry it practically into effect, I will now proceed to describe the same fully.

A general statement of my improved method of protecting metal fences against damage from stock, &c., may be made as follows: The line of fence-wire or other metal conductor, (one or more in number,) being open or disconnected at one end, is charged with electricity in such manner that the contact of a conducting-body upon the earth is required to complete the circuit. The body, thus interposed to complete the circuit is submitted to a shock more or less severe, according to the strength of the current. The capacity of the wire to give a shock upon contact makes it an effectual barrier to the encroachments of stock or intruders of any kind. The appliances employed to carry this method practically into effect will now be described.

A, Fig. 1, represents a battery of any proper kind, from which the wires *a a* extend to the induction-coil B, having the usual automatic circuit-breaker, as shown in Fig. 5.

C represents one of the wires of the circuit, which is extended away upon the posts or supports *c c* in any proper direction and for any desired distance for the purpose of surrounding in whole or in part the space to be inclosed, as shown in Fig. 3. C' C' represent any proper insulators, by means of which the wire is properly secured to the posts or supports. D represents the other end of the circuit, which extends away to the earth-plate *d* in the manner well understood.

If desired, two or more conductors of wire or other metal may extend away from the induction-coil, as shown in Fig. 2; but in this case each of these wires or metal conductors is independent and distinct from the others in its operation.

The operation is substantially as follows: The insulated wire C, being open or disconnected at its ends, forms an open line, which is closed when any conducting-body upon the earth comes in contact with it, the circuit then being completed, as shown in Figs. 1 and 2. The body completing the circuit receives, of course, a shock more or less severe, according to the strength of the current. The fence having this capacity to administer a shock effectually repels any animal coming in contact with the same.

If desired, metal tags X, Fig. 2, may be suspended upon the wire at intervals for the purpose of attracting the animals wholly or in part inclosed thereby, in order that they may approach the same without violence and receive a shock, which shall cause them to avoid the fence thereafter.

If desired, a switch may be located at any proper point for the purpose of diverting a portion of the electrical current for other purposes—*i. e.*, for telegraphing, telephoning, or ringing signal-bells, &c., as shown in Fig. 4.

Some of the advantages resulting from the use of my invention are as follows: A single battery, a single induction-coil, and a single wire or other metal conductor only being required to carry the invention practically into effect, the original cost of introducing the same is very small. The cost of maintaining a battery, also, adapted to generate sufficient electricity to protect a wide extent of space is very small. The simplicity of the parts also renders frequent and skilled attention unnecessary. The effectiveness of the invention in use is very great. Every part of the charged wire or metal conductor has in itself a capacity to administer a shock, and hence complete protection is afforded at every point.

If desired, a single electrical wire or other metal conductor may be combined with other wires or strips or threads of metal, which may be non-electrical, if desired.

Having thus fully described my invention, what I claim as new, and desire to secure by Letters Patent, is—

The combination, with an induction-coil the primary circuit of which includes a battery and an automatic circuit-breaker, of a metal fence included in the secondary circuit, which is grounded at one end only.

This specification signed and witnessed this 6th day of March, 1883.

C. A. BRAINERD.

Witnesses:
WILLIAM J. MILLER,
H. B. STEVENS.